United States Patent [19]

Badesha et al.

[11] Patent Number: 5,668,203

[45] Date of Patent: Sep. 16, 1997

[54] ELASTOMERIC ARTICLES CONTAINING HALOCERAMER COMPOSITIONS

[75] Inventors: Santokh S. Badesha; Arnold W. Henry; Donald A. Seanor, all of Pittsford, N.Y.

[73] Assignee: Xerox Corporation, Stanford, Conn.

[21] Appl. No.: 480,973

[22] Filed: Jun. 7, 1995

[51] Int. Cl.$^6$ .................................................. C08K 5/24
[52] U.S. Cl. .................. 524/265; 524/266; 524/269; 525/330.7; 525/326.2; 526/240; 526/241
[58] Field of Search ............................ 524/265, 266, 524/269, 413; 525/330.7, 326.2; 526/240, 241

[56] References Cited

U.S. PATENT DOCUMENTS

| | | | |
|---|---|---|---|
| 3,070,560 | 12/1962 | Metevia | 260/29 |
| 3,146,799 | 9/1964 | Fekete | 138/125 |
| 3,250,807 | 5/1966 | Fritz et al. | 260/535 |
| 3,294,725 | 12/1966 | Findlay et al. | 260/29.2 |
| 3,330,797 | 7/1967 | Kelly et al. | 260/37 |
| 3,355,406 | 11/1967 | Cekada, Jr. | 260/29.2 |
| 3,360,491 | 12/1967 | Axon | 260/29.2 |
| 3,392,097 | 7/1968 | Gozzo et al. | 204/159.22 |
| 3,442,942 | 5/1969 | Sianesi et al. | 260/544 |
| 3,504,411 | 4/1970 | De Coruso et al. | 29/25.14 |
| 3,632,788 | 1/1972 | Stivers et al. | 260/30.8 R |
| 3,663,842 | 5/1972 | Miller | 310/8.3 |
| 3,697,469 | 10/1972 | Ikoma | 260/29.2 |
| 3,699,145 | 10/1972 | Sianesi et al. | 260/37.5 B |
| 3,715,378 | 2/1973 | Sianesi et al. | 260/463 |
| 3,772,240 | 11/1973 | Greenlee | 260/375 B |
| 3,775,163 | 11/1973 | Marzocchi | 117/126 GB |
| 3,810,874 | 5/1974 | Mitsch et al. | 260/75 H |
| 3,810,875 | 5/1974 | Rice et al. | 260/899 |
| 3,849,594 | 11/1974 | Justice | 178/5.6 |
| 3,850,223 | 11/1974 | Tompkins | 160/84 R |
| 3,893,761 | 7/1975 | Buchan et al. | 355/3 R |
| 4,016,323 | 4/1977 | Volovsek | 428/247 |
| 4,029,827 | 6/1977 | Imperial et al. | 427/22 |
| 4,035,565 | 7/1977 | Apotheker et al. | 526/249 |
| 4,051,100 | 9/1977 | Bjerk et al. | 260/42.18 |
| 4,094,911 | 6/1978 | Mitsch et al. | 260/615 A |
| 4,101,686 | 7/1978 | Strella et al. | 427/22 |
| 4,185,140 | 1/1980 | Strella et al. | 428/418 |
| 4,221,688 | 9/1980 | Johnson et al. | 260/29.2 |
| 4,244,849 | 1/1981 | Saam | 260/29.2 M |
| 4,252,709 | 2/1981 | Skostins | 260/33.45 B |
| 4,257,699 | 3/1981 | Lentz | 355/380 |
| 4,264,181 | 4/1981 | Lentz et al. | 355/380 |
| 4,272,179 | 6/1981 | Seanor | 355/380 |
| 4,278,776 | 7/1981 | Mauro et al. | 525/178 |
| 4,287,320 | 9/1981 | Kolb | 525/340 |
| 4,289,681 | 9/1981 | Nauroth et al. | 260/375 B |
| 4,400,434 | 8/1983 | Santoso et al. | 428/421 |
| 4,405,425 | 9/1983 | Schiller et al. | 204/159.13 |
| 4,450,263 | 5/1984 | West | 526/249 |
| 4,456,633 | 6/1984 | Grossi et al. | 427/138 |
| 4,480,054 | 10/1984 | Enderle | 521/84.1 |
| 4,684,238 | 8/1987 | Till et al. | 355/10 |
| 4,690,967 | 9/1987 | Lagarde et al. | 52/266 |
| 4,743,503 | 5/1988 | Lin et al. | 428/353 |
| 4,770,860 | 9/1988 | Ewers et al. | 423/173 |
| 4,777,087 | 10/1988 | Heeks et al. | 428/321.1 |
| 4,810,760 | 3/1989 | Strepparola et al. | 525/359.3 |
| 4,830,920 | 5/1989 | Hayashi et al. | 526/255 |
| 4,863,985 | 9/1989 | Pouchol et al. | 524/183 |
| 4,894,418 | 1/1990 | Strepparola et al. | 525/185 |
| 4,917,702 | 4/1990 | Scheicher et al. | 623/16 |
| 4,917,980 | 4/1990 | Badesha et al. | 430/58 |
| 5,017,432 | 5/1991 | Eddy et al. | 428/422 |
| 5,026,786 | 6/1991 | Marchionni et al. | 525/356 |
| 5,037,878 | 8/1991 | Cerles et al. | 524/588 |
| 5,043,624 | 8/1991 | Yu | 430/60 |
| 5,099,286 | 3/1992 | Nishise et al. | 355/272 |
| 5,110,702 | 5/1992 | Ng et al. | 430/99 |
| 5,116,703 | 5/1992 | Badesha et al. | 430/59 |
| 5,119,140 | 6/1992 | Berkes et al. | 355/273 |
| 5,125,599 | 6/1992 | Sherman | 244/148 |
| 5,141,788 | 8/1992 | Badesha et al. | 428/36.8 |
| 5,150,161 | 9/1992 | Bujese | 355/256 |
| 5,166,031 | 11/1992 | Badesha et al. | 430/124 |
| 5,171,787 | 12/1992 | Zama et al. | 525/105 |
| 5,196,228 | 3/1993 | Kirby et al. | 427/515 |
| 5,312,856 | 5/1994 | Hert et al. | 524/297 |
| 5,372,796 | 12/1994 | Wellinghoff | 423/65 |

OTHER PUBLICATIONS

"Filler Treatments for Thermally Conductive Silicone Elastomers", Xerox Disclosure Journal, (Sep./Oct. 1980), vol. 5., No. 5, pp. 493–494.

"Ceramers: Hybrid Materials Incorporating Polymeric/Oligomeric Species into Inorganic Classes Utilizing a Sol–Gel Approach", ACS Polymer Reprints (1985), vol. 26(2), pp. 300–301.

*Primary Examiner*—Peter D. Mulcahy
*Attorney, Agent, or Firm*—Oliff & Berridge

[57] ABSTRACT

A haloceramic material having integral, interpenetrating networks of haloelastomer, metal oxide, and optionally polyorganosiloxane forms highly advantageous seals such as gaskets, tapes, diaphragms, bearing, o-rings and the like. The haloceramer seals properties include a combination of thermal stability, chemical inertness and flexibility.

22 Claims, 2 Drawing Sheets

ELASTOMERIC ARTICLES CONTAINING HALOCERAMER COMPOSITIONS

FIELD OF THE INVENTION

This invention relates to haloceramers and grafted haloceramers, and their use as a sealing material. The invention also relates to shaped articles and coatings, such as seals, comprised of haloceramers and grafted haloceramers.

BACKGROUND

Halogen-containing polymers, or halopolymers, are an important class of polymers and include for example, haloelastomers and haloplastics. Such halopolymers have good thermal stability and usefulness at relatively high temperatures, and toughness and flexibility at low temperatures. Some of these polymers are insoluble in a wide variety organic solvents, and are chemically inert. Some have extremely low dielectric loss and high dielectric-strength, and most have unique non-adhesive and low-friction properties.

Fluoroelastomers, particularly the copolymers of vinylidene fluoride with other ethylenically unsaturated halogenated monomers, such as hexafluoropropene, have utility in high temperature applications, such as seals, gaskets, and linings. In such applications, the shaped articles of fluoroelastomers are subject to exposure to aggressive or harsh environments such as solvents, lubricants, oxidizing or reducing conditions, and high temperature differentials.

A major drawback to many applications of shaped articles, such as seals, made of such fluoroelastomers has been their inability to satisfactorily function at low and high temperatures. At temperatures only slightly below 0° C., the articles become stiff and brittle, and fail to perform satisfactorily. Many fluoroelastomers also exhibit a tendency to thermally degrade and structurally break down, losing their elastomeric nature after being exposed to high temperatures as well as repetitive large temperature differentials. Many fluoroelastomers also break down after long periods of exposure to harsh chemicals, such as solvents and lubricants, and to oxidizing or reducing conditions.

In particular sealing environments, the environment is harsh in experiencing large temperature differentials, from low to high temperatures, prolonged exposure to harsh chemicals, such as solvents, fuels and lubricants, and other harsh environmental conditions such as oxidation and reduction conditions. It is possible to find materials to address one of these environmental properties, such as a material that seals adequately in a statically cold environment, but it is very rare to find materials for seals that can withstand all of these harsh conditions.

There is a need for an elastomeric material having the ability to maintain flexibility, toughness and compressive strength after extended exposure to high temperature, low temperature and temperature differentials, to harsh chemical environments and to oxidation and reduction environments so as to be able to perform as a seal over an extended period of time in such severe environments encountered for sealing in areas such as engines, as well as aerospace, aeronautical and oceanographic fields. Such material should also be useful in preparing composite articles such as vacuum-type and pressure-type seals.

Conventional fluoroelastomers can be fabricated into automotive engine oil seals, fuel system components, such as fuel line hoses and o-ring seals, and drive train seals. Smaller, hotter-running automotive engines, modern fuel blends, and aggressive oil additives and other chemical substances used in operating the engines have made fluoroelastomers the polymers of choice for a host of elastomeric engine components where reliable sealing is required and of environmental concern.

Fluoroelastomers have also been utilized in other industries, including seals used in drilling equipment, seals in the aviation industry, such as in fuel tanks and window seals, and in the aerospace industry.

Commercially available fluoroelastomers, such as the illustrative polymers described above, are sold, for example, under the trademarks "AFLAS", "FLUOREL" and "VITON". Some of these are cross-linked with aromatic polyhydroxy compounds, such as bisphenols, which are compounded with the elastomer gum along with a curing accelerator, such as a quaternary phosphonium salt, and acid acceptors, such as magnesium oxide and calcium hydroxide. Such fluoroelastomers are set forth in U.S. Pat. No. 4,287,320 to Kolb. U.S. Pat. Nos. 4,035,565 to Apotheker et al. and 4,450,263 to West describe bromine-containing, peroxide-curable fluoroelastomers.

Several general types of fluorinated ethers have also been described in the literature. One type is characterized by one of several homopolymeric segments or blocks of repeating units of the formula—$CF(CF_3)CF_2$—O— and made from hexafluoropropylene epoxide as set forth in U.S. Pat. No. 3,250,807 to Fritz et al. Another type of fluoropolymer disclosed in U.S. Pat. No. 5,125,599 to Warnell contains blocks of repeating units of the formula —$CF_2CF_2$—O— and is made from tetrafluoroethylene epoxide. Others, made by reacting oxygen with tetrafluoroethylene or hexafluoropropylene, are characterized by backbones of repeating —$CF_2O$— units as set forth in U.S. Pat. No. 3,392,097 to Carraro et al., or —$CF(CF_3)CF_2O$— units as set forth in U.S. Pat. No. 3,442,942 to Sianesi et al., or, in addition to either of these units, units of a formula —$CF(CF_3)O$— as set forth in U.S. Pat. No. 3,699,145 to Sianesi et al., or a backbone consisting of randomly distributed —$CF_2O$— and —$CF_2CF_2O$— units as set forth in U.S. Pat. No. 3,715,378 to Sianesi et al., or a backbone made up of —$CF(CF_3)CF_2O$— and —$CF_2CF_2O$— units and, optionally, —$CF(CF_3)O$— units. Another type of fluorinated ether described in U.S. Pat. Nos. 3,504,411 to Rice and 3,849,594 to Mitsch et al. contains backbone units of the formula —$(CF_2)_aO(CF_2)_b$— made by photopolymerization.

U.S. Pat. Nos. 3,810,874 to Mitsch et al. and 4,094,911 to Mitsch et al. disclose poly(perfluoroalkylene oxides) terminated with polymerizable functional groups which can be polymerized to prepare certain polymers, e.g., polyurethanes, having low glass transition temperatures and low-temperature flexibility. U.S. Pat. No. 3,810,875 to Rice et al. discloses use of poly(perfluoroalkylene oxide) peroxides with ethylenically unsaturated monomers in making block copolymers having good low-temperature flexibility. Fluorinated ethers with non-functional terminal moieties are sold under the trademarks "KRYTOX" and "FOMBLIN" for use as vacuum pump fluids.

U.S. Pat. No. 4,810,760 to Strepparola et al. describes compositions of fluoroelastomer cross-linked with dihydroxypolyfluoroethers. The dihydroxypolyfluoroethers contain either branched moieties or are random copolymers containing —$CF_2O$— repeating units, or contain partially fluorinated repeating units. When used to cross-link fluoroelastomers, the fluorinated ethers are said to yield materials with improved heat stability and greater resistance to compression set. U.S. Pat. No. 4,894,418 to Strepparola et al. discloses compositions of fluoroelastomers comprising, as a processing coadjuvant, a mono- or dihydroxypolyfluoroether. These mono- or dihydroxypolyfluoroethers have similar structures to those disclosed in U.S. Pat. No. 4,810,760 to Strepparola et al. The addition of these mono- or dihydroxypolyfluoroethers to conventional vulcanizable fluoroelastomer compositions is said to improve the processability of the resulting mixture and the low temperature brittle point of the cured mixture.

U.S. Pat. No. 3,632,788 to Stivers et al. describes fluoroolefinic elastomeric formulations with improved low temperature flexibility and softness. The improved properties are imparted by the incorporation of one or more low melting low molecular weight, polar, fluoroaliphatic compounds. U.S. Pat. No. 5,026,786 to Marchionni et al. describes a process for the manufacture of certain perfluoropolyethers. These perfluoropolyethers comprise randomly distributed perfluoroxyalkylene units. These perfluoropolyethers are said to improve the extrudability of elastomer compositions and to decrease the adhesion of vulcanized articles to molds. U.S. Pat. No. 4,278,776 to Mauro et al. discloses vulcanizable mixes based on fluoroelastomers and which comprise at least one fluorinated polyamide. Certain perfluoropolyethers are said to improve the low temperature properties of the vulcanizates.

The above-described fluoroelastomer compositions are comprised of organic components alone.

Ceramer type compositions, which are compositions containing organic and inorganic components, and processes for the preparation thereof are described in: U.S. Pat. Nos. 5,116,703 to Badesha et al.; 5,013,624 to Yu; 4,917,980 to Badesha et al.; 4,400,434 to Santoso; 4,051,100 to Bjerk et al.; 3,775,163 to Marzocchi; 3,663,842 to Miller; 4,743,503 to Lin et al.; and 5,196,228 to Kirby et al.; Lentz et al., "Filler Treatments for Thermally Conductive Silicone Elastomers", Xerox Disclosure Journal, Vol. 5, No. 5, pp. 493-94 (September/October 1980); Wilkes et al., "Ceramers: Hybrid Materials Incorporating Polymeric/Oligomeric Species into Inorganic Classes Utilizing a Sol-Gel Approach", ACS Polymer Reprints, Vol. 26 (2), pp. 300-301 (1985). The disclosures of these references are incorporated herein by reference.

U.S. patent application Ser. No. 08/044,870 to Badesha et al., the disclosure of which is incorporated herein by reference, discloses a fuser member comprising a supporting substrate and a layer comprised of integral interpenetrating networks of haloelastomer and silica, and a composition comprising substantially uniform integral interpenetrating networks of haloelastomer and silica.

U.S. patent application Ser. No. 08/044,860 to Badesha et al., the disclosure of which is incorporated herein by reference, describes a fuser member comprising a supporting substrate and a layer comprised of integral interpenetrating networks of haloelastomer, silica, and polyorganosiloxane, and a composition comprising substantially uniform integral interpenetrating networks of haloelastomer, silica, and polyorganosiloxane.

U.S. patent applications Ser. Nos. 08/141,748 and 08/141,747 to Badesha et al., the disclosures of which are incorporated herein by reference, disclose intermediate transfer component coating/articles of titamer and grafted titamer and ceramer and grafted ceramer.

U.S. patent application Ser. No. 08/035,023 to Badesha et al., the disclosure of which is incorporated herein by reference, describes an intermediate toner transfer component comprised of a substrate and thereover a coating/article comprised of a volume grafted elastomer, which is a substantially uniform integral interpenetrating network of a hybrid composition of a fluoroelastomer and a polyorganosiloxane. The volume graft is formed by dehydrofluorination of the fluoroelastomer by a nucleophilic dehydrofluorinating agent, followed by addition polymerization by the addition of an alkene or alkyne functionally terminated polyorganosiloxane and a polymerization initiator.

U.S. patent application Ser. No. 08/083,922 to Badesha, the disclosure of which is incorporated herein by reference, describes a fuser member comprising a supporting substrate and a layer comprised of integral interpenetrating networks of haloelastomer and titanium oxide, and a composition comprising substantially uniform integral interpenetrating networks of haloelastomer and titanium oxide.

U.S. patent application Ser. No. 08/084,882 to Badesha, the disclosure of which is incorporated herein by reference, sets forth a fuser member comprising a supporting substrate and a layer comprised of integral interpenetrating networks of haloelastomer, titanium oxide, and polyorganosiloxane, and a composition comprising substantially uniform integral interpenetrating networks of haloelastomer, titanium oxide, and polyorganosiloxane.

SUMMARY OF THE INVENTION

The present invention relates to elastomeric seals comprising a haloceramic material having integral, interpenetrating networks of haloelastomer, metal oxide, and optionally polyorganosiloxane. The elastomeric seal, which can be either an article or a coating on an article, may comprise a gasket, bearing, o-ring, joint seal, tape, diaphragm or other conventional seal.

The elastomeric seal article or coated article of the present invention possesses superior toughness, excellent wear resistance, flexibility at low and high temperatures, resistance to physical and chemical breakdown, excellent resistance to repetitive temperature differentials, degradation resistance against harsh chemicals and oxidation/reduction environments and resistance to swelling in solvents and hydrocarbon fluids.

DETAILED DESCRIPTION OF PREFERRED EMBODIMENTS

None of the references or applications discussed in the background section above indicate the utility of haloceramer compositions as sealing components in shaped or coated articles. It has been found that when a material of haloceramer is utilized as a seal, for example within a component or between components, in stressful sealing environments such as in engine blocks, fuel tanks and fuel system seals, drive train seals, in oil drilling and other refining apparatus, and the like where high temperature differentials and exposure to harsh chemical and physical environments is encountered, the seal retains its properties over time without becoming brittle, thermally degrading, or otherwise losing the elastomeric properties. The haloceramer seal retains excellent flexibility, tensile strength, elongation and compressive strength following prolonged exposure to environments having all of high and low temperatures, harsh chemicals and oxidation/reduction problems.

The haloceramer sealing materials of the present invention surprisingly and unexpectedly possess more flexibility and are also tougher than the above-discussed fluoroelastomer compositions, and thus possess excellent wear resistance in sealing environments. The haloceramer materials also possess an excellent resistance to harsh chemicals such as solvents, fuels, lubricants, etc., and to high temperature differentials that might be encountered in such sealing environments. Resistance to all of these various harsh environmental characteristics is quite rare and surprising.

By the term seal in the present invention is meant a material which is within or between components and acts as a barrier to the passage of gases and/or liquids around and/or through the seal. For example, seals include gaskets, bearings, joint seals, o-rings, tapes, and the like. The seal can act as a seal in such structures as joints, valves, seams and other structures where two pieces or components or portions thereof are united.

The elastomeric seal article or coated article of the present invention possesses superior toughness, excellent wear resistance, flexibility at low and high temperatures, resistance to physical and chemical breakdown, resistance to repetitive temperature differentials, degradation resistance against harsh chemicals and oxidation/reduction environments and resistance to swelling in solvents and hydrocarbon fluids compared to conventional fluoroelastomer type compositions.

For example, as a seal in an engine block, the elastomeric haloceramer composition is able to withstand high temperatures while retaining flexibility and having excellent oil resistance. As a seal in a fuel tank or in an under hole drilling apparatus, the composition is able to withstand frequent wide temperature variations (low and high temperatures), has oil and fuel resistance, including a resistance to both acids and bases, and has an unexpected toughness against wear resistance as well. The haloceramer seal composition can also have excellent adhesive bonding properties.

It is surprising that the haloceramer sealing material not only has more flexibility than conventional fluoroelastomer materials, but that it also is tougher and has superior strength and wear resistance.

The term ceramer generically refers to a hybrid material of organic and inorganic composition which typically has ceramic like properties. As used herein, the term haloceramer refers to, in embodiments of the present invention, a composition comprised of substantially uniform integral interpenetrating networks of haloelastomer and metal oxide, wherein both the structure and the composition of the haloelastomer and metal oxide networks are substantially uniform. As used herein, the phrase grafted haloceramer refers to a composition comprised of substantially uniform integral interpenetrating networks of haloelastomer, metal oxide, and polyorganosiloxane, wherein both the structure and the composition of the haloelastomer, metal oxide, and polyorganosiloxane are substantially uniform. The term "halo" as used herein refers to halogen containing compositions, such as, fluorine, chlorine, bromine, etc. containing compositions. Haloceramer, as used herein, may include other additives or fillers.

The phrase interpenetrating network refers to the intertwining of the haloelastomer and metal oxide polymer strands for the haloceramer, and to the intertwining of the haloelastomer, metal oxide, and polyorganosiloxane polymer strands for the grafted ceramer.

The phrases "metal oxide," "network of metal oxide," "metal oxide network," and similar phrases refer to alternating, covalently bound atoms of metal and oxygen, wherein the alternating atoms of metal and oxygen may exist in a linear, branched, and/or lattice pattern. The atoms of metal and oxygen exist in a network and not as discrete particles. The metal oxides of the present invention include silicon oxide, titanium oxide, aluminum oxide, zinc oxide, copper oxide, iron oxide, arsenic oxide, selenium oxide, tellurium oxide or mixtures thereof, for example.

Unless otherwise indicated, the term elastomeric coating/article refers to a sealing material containing the haloceramer or the grafted haloceramer. In embodiments, the haloceramer or the grafted haloceramer may be a coating over various substrates (e.g., fluoroelastomeric, metal, glass, ceramic, etc.) or the elastomeric article may comprise the haloceramer or grafted haloceramer with or without a coating.

In embodiments, the coatings/articles are haloceramer compositions comprised of substantially uniform, integral, interpenetrating networks of haloelastomer and metal oxide. The haloelastomer is present in an effective amount in the haloceramer, generally ranging from about 99 to about 25%, preferably ranging from about 95 to about 50%, and more preferably ranging from about 90 to about 60% by weight based on the weight of the coating/article. The metal oxide is present in an effective amount in the haloceramer, generally ranging from about 1 to about 50%, preferably ranging from about 5 to about 25%, and more preferably ranging from about 10 to about 20% by weight based on the weight of the coating/article. In preferred embodiments, a coupler, especially an amine coupler, also may be present in an effective amount in the haloceramer, generally ranging from about 0.5 to about 15%, and more preferably ranging from about 0.5 to about 5% by weight based on the weight of the coating/article.

A representative structural formula for the haloceramer is as follows:

In the above formula, the symbol "~" represents the continuation of the polymeric network; and M represents at least one of Ti, Si, Al, Zn, Cu, Fe, As, Se or Te. Preferably, M is Si or Ti.

In embodiments, the coating/article on the substrate is a grafted haloceramer composition comprised of substantially uniform, integral, interpenetrating networks of haloelastomer, metal oxide, and polyorganosiloxane. The haloelastomer is present in an effective amount in the grafted haloceramer, generally ranging from about 99 to about 25%, preferably from about 95 to about 50%, and more preferably from about 90 to about 60%, by weight based on the weight of the coating/article. The metal oxide is present in an effective amount in the grafted haloceramer, generally ranging from about 1 to about 50%, preferably from about 5 to about 25%, and more preferably from about 10 to about 20%, by weight based on the weight of the coating/article. The polyorganosiloxane is present in an effective amount in the grafted haloceramer, generally ranging from about 1 to about 50%, preferably ranging from about 5 to about 25%, and more preferably ranging from about 10 to about 20%, by weight based on the weight of the coating/article. In preferred embodiments, a coupler, especially an amine coupler, also may be present in an effective amount in the grafted haloceramer, generally ranging from about 0.5 to about 15%, preferably ranging from about 0.5 to about 5%, by weight based on the weight of the coating/article, and more preferably ranging from about 0.5 to about 5% by weight based on the weight of the coating/article.

A representative structural formula for the grafted haloceramer is as follows:

In the above formula, R is the R group of from the polyorganosiloxane and may independently be a substituent such as, for example, an alkyl, alkenyl or aryl, wherein the aryl is optionally substituted with an amino, hydroxy, mercapto, alkyl or alkenyl group; n represents the number of segments; M represents at least one of Si, Al, Ti, Zn, Cu, Fe, As, Se and Te; and the symbol "~" represents the continuation of the polymeric network.

Preferably, M is Si or Ti. The haloelastomer may be any suitable halogen containing elastomer such as a fluoroelastomer, chloroelastomer, a bromoelastomer, or the like, or a mixture thereof, and preferably is a fluoroelastomer. Fluoroelastomer examples include those described in detail in U.S. Pat. No. 4,257,699 to Lentz, as well as those described in U.S. Pat. No. 5,017,432 to Eddy et al. and U.S. Pat. No. 5,061,965 to Ferguson et al., the disclosures of which are totally incorporated herein by reference. As described therein, these fluoroelastomers, particularly from the class of copolymers and terpolymers of vinylidenefluoride hexafluoropropylene and tetrafluoroethylene, are known commercially under various designations as VITON A™, VITON ETM, VITON E60C™, VITON E430™, VITON 910™, VITON GH™ and VITON GF™. The VITON™ designation is a Trademark of E. I. dupont de Nemours, Inc. Other commercially available materials include FLUOREL 2170™, FLUOREL 2174™, FLUOREL 2176™, FLUOREL 2177™ and FLUOREL LVS 76™, FLUOREL being a Trademark of 3M Company. Additional commercially available materials include AFLAS™ a poly (propylene-tetrafluoroethylene), FLUOREL II™ (LII900) a poly(propylene-tetrafluoroethylene-vinylidenefluoride), both also available from 3M Company, as well as the TECNOFLON™ compositions identified as FOR-60KIR, FOR-LHF, NM, FOR-THF, FOR-TFS, TH, TN505 available from Montedison Specialty Chemical Co.

Typically, these fluoroelastomers are cured with a nucleophilic addition curing system, such as a bisphenol crosslinking agent with an organophosphonium salt accelerator as described in further detail in the above referenced Lentz Patent and in U.S. Pat. No. 5,017,432. In a particularly preferred embodiment, the fluoroelastomer is one having a relatively low quantity of vinylidenefluoride, such as in VITON GF™, available from E. I. dupont de Nemours, Inc. The VITON GF™ has 35 weight percent vinylidenefluoride, 34 weight percent hexafluoropropylene and 29 weight percent tetrafluoroethylene with 2 weight percent cure site monomer. It is generally cured with bisphenol phosphonium salt, or a conventional aliphatic peroxide curing agent.

It is believed that some of the aforementioned haloelastomers and others that can be selected have the following formulas: VITON E-45 wherein the subscripts, such as x, y, and z, represent the number of repeating segments.

The source of the metal oxide network may be any suitable metallic compound. For example the metal oxide source may be any suitable compound such as that having the formula $M(A)_4$. In this formula, A may be for example OR, where R is an alkyl having 1 to 24 carbon atoms such as methyl, ethyl, propyl, butyl, pentyl, hexyl, heptyl, octyl, and the like; a halogen; hydroxy; or hydride. M is an appropriate metal such as Si, Al, Ti, Zn, Cu, Fe, As, Se and Te. Preferred metals are Si, Ti, Al and Zn. Most preferred are Si and Ti. A preferred source compound for a silicon oxide network includes tetraethoxyorthosilicate. A preferred source compound of a titanium oxide network may be a titanium tetraalkoxide compound and titanium isobutoxide.

For grafted haloceramers, preferred examples of the polyorganosiloxane having functionality according to the present invention are of the formula:

where R independently is an alkyl having, for example, from 1 to 24 carbon atoms, and preferably from 1 to 12 carbon atoms; alkenyl having, for example, from 2 to 24 carbon atoms, and preferably from 1 to 12 carbon atoms; or aryl having, for example, from 6 to 24 carbon atoms, and preferably from 6 to 18 carbon atoms, wherein the aryl group is optionally substituted with an amino, hydroxy, mercapto or an alkyl having, for example, from 1 to 24 carbon atoms, and preferably from 1 to 12 carbon atoms, or alkenyl group having from 2 to 24 carbon atoms, and preferably from 2 to 12 carbon atoms. In preferred embodiments, R is independently selected from methyl, ethyl, and phenyl. The functional group A may be an alkene or alkyne group having, for example, from 2 to 8 carbon atoms, preferably from 2 to 4 carbon atoms, optionally substituted with an alkyl having, for example, from 1 to 24 carbon atoms, and preferably from 1 to 12 carbon atoms, or an aryl group having, for example, from 6 to 24 carbon atoms, and preferably from 6 to 18 carbon atoms. Functional group A can also be mono-, di-, or trialkoxysilane having 1 to 10, preferably 1 to 6, carbon atoms in each alkoxy group, hydroxy, or halogen. Preferred alkoxy groups include methoxy, ethoxy, and the like. Preferred halogens include chlorine, bromine and fluorine. In the above formula, n represents the number of segments and may be for example 2 to 350, and preferably from about 5 to about 100. In the above formula, typical R groups include methyl, ethyl, propyl, octyl, vinyl, allyl, crotonyl, phenyl, naphthyl and phenanthryl and typical substituted aryl groups are substituted in the ortho, meta and para positions with lower alkyl groups having less than 15 carbon atoms, and preferably from 1 to 10 carbon atoms. In a preferred embodiment, n is between 60 and 80. Typical alkene and alkenyl functional groups include vinyl, acryl, crotonyl and acetenyl which may typically be substituted with methyl, propyl, butyl, benzyl, and/or tolyl groups, and the like.

If the haloceramer seal according to the present invention must also possess strong adhesive properties, an additional silane material of:

wherein R is a group as defined above, is included in the process of making haloceramers or grafted haloceramers. If a grafted haloceramer is being produced, the silane is used in addition to the polyorganosiloxanes. The silanes can be present in effective amounts of 1 to 50 wt. %, preferably 5 to 25 wt. %, most preferably 10 to 20 wt. % by weight of the composition. A haloceramer or grafted haloceramer produced using such silanes has excellent bonding properties.

The polyorganosiloxane in the grafted haloceramer differs from the formula disclosed herein for the functionally terminated polyorganosiloxane reactant, since the functional ends may have undergone reactions with the metal oxide network, haloelastomer, amine coupler, or other polyorganosiloxane. For example, functional group A in the case of, for instance, trialkoxysilane, may undergo hydrolysis followed by condensation reactions with the pendant functional groups of the amine coupler which may be already attached to the haloelastomer or the metal oxide network.

In embodiments, the first step is that all the siloxy and metallic groups undergo hydrolysis. The reaction will proceed with only some of the siloxy and metallic groups undergoing hydrolysis, but ultimately most of the groups will undergo hydrolysis. The second step is the condensation reaction giving rise to the M—O—M linkages (where M=Si, Ti, Al, Zn, Cu, Fe, As, Se and/or Te). For this reaction, one may optionally employ a catalyst which can be an acid like acetic, hydrochloric, sulfuric, and the like. The chemistry would be similar if functional group A is hydroxy or a halogen. If functional group A is alkyne or alkene, then an initiator such as benzoyl peroxide may optionally be employed and, in embodiments, one of the pendant groups on the coupler typically may also be an alkene or alkyne.

Adjuvants and fillers may be optionally incorporated in the haloceramer and the grafted haloceramer compositions in accordance with the present invention in an effective amount, generally ranging from about 1 to about 50% by weight, preferably from about 2 to about 30% by weight, and more preferably from about 3 to about 15% by weight, based on the weight of the coating/article. Such adjuvants and fillers typically include for example coloring agents, reinforcing fillers, crosslinking agents, processing aids, accelerators and polymerization initiators, and the like. Specific examples of fillers and adjuvants include silica, carbon black, iron oxide, aluminum oxide, aluminum nitride, boron nitride, and the like.

In embodiments, the haloceramer may be prepared by dissolving an effective amount of the haloelastomer, e.g., generally about 1 to about 35% by weight, preferably from about 2 to about 20% by weight, more preferably about 5 to about 15% by weight, in an effective amount of a suitable solvent, such as an aliphatic hydrocarbon including for example methyl ethyl ketone, methyl isobutyl ketone and the like at any effective temperature, preferably about 25° C. An amine based coupler having one or more pendant functional groups is added in an effective amount, e.g., generally about 1 to about 15% by weight, preferably about 2 to about 12% by weight, more preferably about 3 to about 10% by weight relative to the weight of the haloelastomer, followed by stirring of the solution for about 15 to about 60 minutes at a temperature of about 45° to about 100° C. An effective amount of a metal oxide source compound, for example a silane compound where the metal oxide as silicon oxide, such as tetraethoxyorthosilicate, e.g., generally about 1 to about 75% weight, preferably about 2 to about 60% by weight, more preferably 5 to about 50% by weight relative to the weight of haloelastomer, is then added and heating is continued at a temperature of about 45° to about 100° C. for an additional 20 minutes to about 10 hours. Any effective sequence of addition of the various components may be used to prepare the haloceramer. For example, in embodiments, the haloelastomer may be added to a solvent already containing the amine coupler and/or the silane compound. The preferred time of reaction is about 4 hours at about 65° C.

In embodiments, the grafted haloceramer may be prepared by dissolving an effective amount of the haloelastomer, e.g., generally about 1 to about 35% by weight, preferably about 2 to about 25% by weight, more preferably about 5 to about 15% by weight, in an effective amount of a suitable solvent, such as an aliphatic hydrocarbon including for example methyl ethyl ketone, methyl isobutyl ketone and the like at any effective temperature, preferably about 25° C. An amine based coupler having one or more pendant functional groups in an effective amount, e.g., generally about 0.5 to about 15% by weight, preferably about 1 to about 12% by weight, more preferably about 2 to about 10% by weight, of the haloelastomer is added, followed by stirring of the solution for about 15 to about 60 minutes at a temperature of about 45° to about 100° C. An effective amount of a source compound for the metal oxide network, for example a titanium oxide compound such as titanium isobutoxide, e.g., generally about 1 to about 75% by weight, preferably about 7 to about 60% by weight, more preferably about 5 to about 50% by weight, relative to the weight of haloelastomer, is then added and heating is continued at a temperature of about 45° to about 100° C. for an additional 20 minutes to about 10 hours. An effective amount of a functionally terminated polyorganosiloxane, e.g., generally about 5 to about 75% by weight, preferably about 7 to about 60% by weight, more preferably about 10 to about 50% by weight, relative to the weight of the haloelastomer, is then added, optionally with a polymerization initiator such as benzoyl peroxide in an effective concentration, e.g., generally about 0.5 to about 10% by weight, preferably about 1 to about 8% by weight, more preferably about 2 to about 5% by weight, relative to the weight of polyorganosiloxane, followed by heating at a temperature of about 45° to about 100° C. for an additional 20 minutes to about 10 hours. Any effective sequence of addition of the various components may be used to prepare the grafted haloceramer. For example, in embodiments, the haloelastomer may be added to a solvent already containing the amine coupler and/or the metal oxide source compound. Also, the polyorganosiloxane may be added at any effective stage, and preferably prior to or during the formation of the networks of the haloelastomer and metal oxide polymeric strands. The preferred reaction time is about 4 hours at about 65° C.

In preferred embodiments, the processes to prepare the haloceramer and the grafted haloceramer may also include other components to facilitate the preparation thereof. For example, a nucleophilic curing agent for the haloelastomer such as Viton Curative No. 50 and diamines such as Diak No. 1 and Diak No. 3 available from E. I. dupont de Nemours, Inc. may be employed at an effective concentration, generally about 1 to about 15% by weight, preferably about 1 to 13% by weight, more preferably about 2 to about 10% by weight, relative to the weight of the haloelastomer. Viton Curative No. 50, which incorporates an accelerator (a quaternary phosphonium salt or salts) and a crosslinking agent, such as bisphenol AF in a single curative system, may be added in a 3 to 7 percent solution predissolved to the haloelastomer compound. Also, the basic oxides such as MgO and/or Ca(OH)$_2$ in effective amounts, generally about 0.5 to about 10% by weight, preferably about 0.5 to about 7% by weight, more preferably about 1 to about 3% by weight, relative to the weight of the haloelastomer, may be added in particulate form to the solution mixture.

The mixture of the haloceramer/grafted haloceramer with the curative and the oxides is then ball milled for about 2 to about 24 hours and preferably, about 5 to about 15 hours to obtain a fine dispersion of the oxides. The curative component can also be added after ball milling in a solution form. The solution of the curative is generally prepared by dissolving Viton Curative No. 50 or the like in methyl ethyl ketone ("MEK") or methyl isobutyl ketone ("MIBK"). The concentration of the solids, i.e., the haloceramer/grafted haloceramer with the curative and the oxides, can vary from about 5% to 25% by weight, preferably from about 7 to about 20% by weight, and more preferably from about 10 to about 15% by weight.

The curing agent for the haloelastomer crosslinks the haloelastomer chains by creating, for example, carbon-oxygen-carbon crosslinking where the curing agent is for example a bisphenol type compound such as Viton Curative No. 50. The networks of haloelastomer, optional polyorganosiloxane and metal oxide are formed in the solution and the crosslinking action of the curing agent does not appear to interfere with the formation of the haloelastomer, polyorganosiloxane and metal oxide networks.

The amine coupler is preferably selected from the group of strong nucleophilic agents such as peroxides, hydrides, bases, amines, and the like. The preferred agents are selected from the group consisting of primary, secondary and tertiary, aliphatic and aromatic amines, where the aliphatic and aromatic groups have from 2 to 15 carbon atoms. The coupler is selected from the groups which have multifunctionality, one of which is capable of dehydrohalogenation of the haloelastomer thereby creating unsaturation sites followed by an addition reaction. This would result in a product which will have pendant coupler chains. The other functionalities on the coupler are desired to undergo further reactions with the metal oxide source compound and functionally terminated polyorganosiloxanes. Examples of nucleophilic functionality include amines, peroxides, hydrides, and the like. Functionalities which would undergo reactions with the metal oxide source compound include siloxy, hydride, halogen, hydroxy, and the like. Functionalities which would undergo reaction with the polyorganosiloxanes for grafted haloceramers could be alkene, alkyne, siloxy, hydride, halogen, hydroxy, and the like. The amine coupler may include aliphatic and aromatic diamines and triamines having from 2 to 15 carbon atoms where the aromatic groups may be benzene, toluene, naphthalene or anthracene, and the like. It is generally preferred for the aromatic diamines and triamines that the aromatic group be substituted in the ortho, meta and para positions. Typical substituents include lower alkylamino groups such as ethylamino, propylamino and butylamino with propylamino being preferred. Following are examples of commercially available couplers which can be used: N-(2-aminoethyl-3-aminopropyl)-trimethoxysilane available as A0700 from Huls America Inc.; 3-(N-styrylmethyl-2-aminoethylamino) propyltrimethoxysilane hydrochloride available as S-1590 from Huls America Inc.; and (aminoethylaminomethyl)-phenylethyltrimethoxysilane available as A0698 from Huls America Inc.

Although it is not desired to be limited by theory, the following reactions are believed to occur during preparation of the haloceramer. An amine coupler having at least one pendant functional group, such as silane, dehydrohalogenates the haloelastomer, resulting in the elimination of a hydrohalogen acid such as hydrofluoric acid and the generation of unsaturated carbon to carbon double bonds on the haloelastomer. The amine coupler adds to one of the carbon atoms of the carbon to carbon double bonds, thereby forming a nitrogen to carbon bond. A hydrolyzable metal oxide source compound is added, which undergoes hydrolysis, and the hydrolyzed metal oxide source compound reacts with the pendant silane groups of the amine coupler in, for example, a condensation type reaction. The pendant functional groups of the amine coupler act as initiation sites for the metal oxide network and the metal oxide network grows by the coupling of additional silane compounds to the network via metal-oxygen bonds by for example condensation type reactions. There is formed a generally homogeneous incorporation of metal oxide network into the haloelastomer network. The various polymeric strands of the haloceramer are integral interpenetrating networks. The term integral as applied to the haloceramer refers to the linking together of the haloelastomer and the metal oxide networks via for example a coupler, especially an amine coupler, wherein one end of the coupler is covalently bonded to the haloelastomer and another end of the coupler is covalently bonded to the metal oxide network.

Although it is not desired to be limited by theory, the following reactions are believed to occur during preparation of the grafted haloceramer. An amine coupler having at least one pendant silane group dehydrohalogenates the haloelastomer, resulting in the elimination of a hydrohalogen acid such as hydrofluoric acid and the generation of unsaturated carbon to carbon double bonds on the haloelastomer. The amine coupler adds to one of the carbon atoms of the carbon to carbon double bonds, thereby forming a nitrogen to carbon bond. A hydrolyzable source compound for the metal oxide network ("source compound"), such as a silane compound for the silicon oxide network, especially tetraethoxyorthosilicate, is added, which undergoes hydrolysis, and the hydrolyzed source compound reacts with the pendant silane groups of the amine coupler in for example a condensation type reaction. The pendant functional groups of the amine coupler act as initiation sites for the metal oxide network and the metal oxide network grows by the coupling of additional hydrolyzed source compounds to the network via metal-oxygen bonds by for example condensation type reactions. A functionally terminated polyorganosiloxane is added to the solution comprised of the haloelastomer and the source compound for the metal oxide network, with such addition preferably occurring after the initiation of the formation of the intertwining polymeric strands of the haloelastomer and metal oxide. Depending on the nature of its terminal functionality, the polyorganosiloxane can attach to one or more of the following: unsaturation sites on the haloelastomer, i.e., the carbon to carbon double bonds, by, for example, a free radical polymerization route; the metal oxide polymeric strands via a silicon to oxygen to metal (Si, Ti, Al, Zn, Cu, Fe, As, Se, Te, etc.) covalent bond by for example a condensation type reaction; or the pendant functional groups of the amine coupler by for example a silicon to oxygen covalent bond involving for instance a condensation type reaction.

In embodiments, to facilitate condensation reactions to promote the growth of the various networks, all the functional groups (e.g., siloxy) of the amine coupler, source compound for the metal oxide network, and polyorganosiloxane undergo hydrolysis. In embodiments where the polyorganosiloxane has a terminal functionality of an alkene or alkyne, the polyorganosiloxane attaches to the unsaturation sites on the haloelastomer. In embodiments where the terminal functionality is an alkoxy such as ethoxy, the polyorganosiloxane attaches to the metal oxide network and/or the pendant functional groups of the amine coupler. The polyorganosiloxane may polymerize via its functional groups by for example condensation type reactions.

The various polymeric strands of the grafted haloceramer are integral interpenetrating networks. The term integral as applied to the grafted haloceramer refers to one or more of the following: the linking together of the haloelastomer and the metal oxide networks via for example a coupler, especially an amine coupler, wherein one end of the coupler is covalently bonded to the haloelastomer and another end of the coupler is covalently bonded to the metal oxide network, covalent bonding of the polyorganosiloxane with the haloelastomer via carbon to carbon bonds, and covalent bonding of the polyorganosiloxane with the metal oxide network via silicon to oxygen to metal (Si, Ti, Al, Zn, Cu, Fe, As, Se, Te, etc.) covalent bonds. Since the polyorganosiloxane may bind to the metal oxide network, the grafted haloceramer in certain embodiments may contain polymeric strands containing segments of both metal oxide and, e.g., polyorganosiloxane.

The haloceramer compositions of the present invention may also be further compounded, and cured with other haloceramers according to standard methods. For example, the cured haloceramers may be ground into small particles/ pieces and incorporated into a fluoroelastomer to be cured. Additionally, the haloceramers may be mixed with the fluoroelastomer prior to curing each composition. In order to form cured articles, these mixtures may be further compounded with a crosslinking agent, such as a polyhydroxy, or a peroxide cure system.

The most common crosslinking agent for the fluoroelastomer is a polyhydroxy compound. The polyhydroxy compound used in its free or non-salt form and as the anionic part of the salt component of the crosslinking agent can be any of those polyhydroxy compounds which function as a crosslinking agent or co-curative for fluoroelastomers, such as those polyhydroxy compounds disclosed in U.S. Pat. No. 4,259,463 to Moggi et al., U.S. Pat. No. 3,876,654 to Pattison, U.S. Pat. No. 4,233,421 to Worm, and U.S. Defensive Publication T107,801 by Nersasian, the disclosures of which are hereby incorporated by reference. For example, representative aromatic polyhydroxy compounds include any of the following: di-, tri-, and tetrahydroxybenzenes, naphthalenes, and anthracenes, and bisphenols.

Representative aliphatic polyhydroxy compounds which can also be used as the polyhydroxy compound in this invention include fluoroaliphatic diols, e.g., 1,1,6,6-tetrahydrooctafluorohexanediol, and others such as those described in U.S. Pat. No. 4,358,559 to Holcomb et al. and references cited therein. Derivatives of polyhydroxy compounds can also be used such as those described in U.S. Pat. No. 4,446,270 to Guenthner et al. and include, for example, 2-(4-allyloxyphenyl)-2-(4-hydroxyphenyl)propane. Mixtures of two or more of the polyhydroxy compounds can be used.

Organo-onium compounds which can be incorporated into or compounded with the fluoroelastomer as co-curing agents or vulcanization accelerators include those known and described in the art. See, for example, the description of such organo-onium compounds in U.S. Pat. No. 4,882,390 to Grootaert et al. The organo-onium compounds which can be used include quaternary organo-onium compounds, such as ammonium, arsonium, phosphonium, stibonium, aminophosphonium, phosphorane (e.g., triarylphosphorane), and iminium compounds, and sulfonium compounds. Mixtures of organo-onium compounds are also useful in this invention.

Another class which can be used is amino-phosphonium compounds, some of which are described, for example, in U.S. Pat. No. 4,259,463 to Moggi et al. Another useful class is phosphorane compounds disclosed, for example, in U.S. Pat. No. 3,752,787 to de Brunner and U.S. Pat. No. 4,882, 390 to Grootaert et al. Another class of quaternary organo-onium compounds useful in this invention are iminium compounds, which are also described in the abovementioned U.S. Pat. No. 4,882,390.

The compounded formulation of this invention can also include processing agents, such as those conventionally used to aid in the molding or extrusion of the formulation, e.g., carnauba wax or dichlorodiphenyl sulfone, including those of the formula $RfSO_2NHR''$, where Rf is a fluoroaliphatic radical such as a perfluoroalkyl, e.g., $C_nF_{2n+1}$ where n is 4 to 20, or perfluorocycloalkyl, e.g., $C_nF_{2n-1}$ where n is 5 to 20. Another type of processing aid which can be used in this invention is diorgano sulfur oxides, such as those described in U.S. Pat. No. 4,287,320 to Kolb.

Fillers can be mixed with the fluoroelastomer to improve molding characteristics and other properties. When a filler is employed, it can be added to the vulcanization recipe in amounts of up to about 100 parts per hundred parts by weight of fluoroelastomer, preferably between about 15 to 50 parts per hundred parts by weight of the fluoroelastomer. Examples of fillers which may be used are reinforcing thermal grade carbon blacks or non-black pigments of relatively low reinforcement characteristics such as clays and barytes.

Fluoroelastomers which can be used in this invention include those described, for example, in e.g., U.S. Pat. No. 3,159,609 to Harris et al., U.S. Pat. No. 3,467,635 to Brasen et al., U.S. Pat. No. 4,214,060 to Apotheker, U.S. Pat. No. 4,233,421 to Worm, and U.S. Pat. No. 4,263,414 to West. Some of these are commercially available, sold under trademarks such as "Fluorel" and "Viton", and are copolymers whose interpolymerized units are generally derived from vinylidene fluoride and one or more other co-monomers. Other useful fluoroelastomers include copolymers of tetrafluoroethylene and propylene, such as those commercially available as AFLAS™ elastomers. Among the fluoroelastomer polymers which may be compounded in accordance with this invention are the elastomeric copolymers whose interpolymerized units are derived from two or more of the following fluoromonomers: vinylidene fluoride, hexafluoropropene, chlorotrifluoroethylene, 2-chloropentafluoro-propene, fluorinated methyl vinyl ether, tetrafluoroethylene, 1-hydro-pentafluoropropene, dichlorodifluoroethylene, trifluoroethylene, 1,1-chlorofluoroethylene, and mixtures thereof. Said fluoromonomers may also be copolymerized with other compounds such as non-fluorinated alpha-olefin co-monomers, e.g., ethylene or propylene. The preferred elastomers are copolymers of vinylidene fluoride with at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, lower fluoroalkyl radical, or lower fluoroalkoxy radical; particularly preferred are hexafluoropropene, tetrafluoroethylene, chlorotrifluroethylene, and 1-hydropenta-fluoropropene. Particularly preferred are the fluorinated elastomers produced by copolymerizing vinylidene fluoride with hexafluoropropene as described in U.S. Pat. No. 3,051,677 to Rexford and U.S. Pat. No. 3,318,854 to Pailthorp et al., and those copolymers produced by copolymerizing vinylidene fluoride, hexafluoropropene, and tetrafluoroethylene as described in U.S. Pat. No. 2,968,649 to Honn et al. The elastomeric copolymers of hexafluoropropene and vinylidene fluoride preferably will have between about 15 and about 50 mole percent hexafluoropropene, optionally with the addition of up to 30 mole percent tetrafluoroethylene. Mixtures or blends of elastomers, e.g., of different viscosities, are also suitable.

The haloceramer compositions and seals thereof of this invention can be bonded to any solid material. Among the materials which can be employed in preparing the elastomeric articles of the invention include metal and metal alloys, such as steel, phosphatized steel, aluminum, iodized aluminum, copper, tin, brass, bronze, and the like; siliceous materials, such as glass cloth, ceramics, porcelain, and the like; organic fibers, such as wool, cotton, and the like; and any of the various synthetic organic fibers, such as nylon, "Dacron", and the like; cellulosic materials, such as wood, paper, cellophane, cellulose acetate, cellulose butyrate, methyl cellulose, ethyl cellulose, butyl cellulose, and the like; organic elastomers, such as natural rubber, chloroprene, neoprene, butadiene-styrene copolymers, acrylonitrile-butadiene copolymers and the like; polymeric substances, including addition-type polymers, such as polyethylene, polypropylene, polyvinylchloride, polyvinylidene chloride, polyvinyl acetate, polyacrylonitrile, polymeric methylacrylate and the like; the various copolymers of such materials; and condensation-type polymers, such as the solid reaction products of hexamethylene diamine with dibasic acids, such as adipic and sebacic acid, the solid reaction products of methyl terephthalate and ethylene glycol, and polycondensation products of caprolactam, and the like. In addition to adhering to other substances, the haloceramer compositions of this invention readily adhere to one another.

Elastomeric seals of this invention can exist in a wide variety of forms. Thus, the haloceramer compositions employed in this invention can be bonded to various natural or synthetic materials in the shape of slabs, rods, films, sheets, strips, rings, matted fibers, molded articles, and the like, to produce a wide variety of seals such as gaskets, tapes, diaphragms, bearings, o-rings and the like.

One form which the elastomeric seals of this invention can take is that of a laminate in which plies of natural or synthetic materials are bonded to plies of haloceramers. These laminated seals can be comprised of a multiplicity of plies of like or unlike natural or synthetic materials held together by a multiplicity of plies of haloceramers, or they can be comprised of a single ply of natural or synthetic material bonded to a single ply of haloceramer. Such laminates can also comprise a composite of two plies of like or unlike natural or synthetic material bonded together by a single ply of haloceramer, or they can be comprised of two plies of haloceramer coated on an intermediate ply of natural synthetic material. When the haloceramer forms an outer ply of such laminates, the free haloceramer surface thereof can be caused to adhere to other materials, and additional plies of natural or synthetic materials can be bonded thereto. By continually adhering to alternate plies of haloceramer and other materials, laminates of any desired size and thickness can be produced. Such laminates can then be cut into any desired shape and employed as seals, gaskets, tapes, diaphragms, bearings, o-rings and in various other applications.

Another form which the elastomer articles of this invention can take is that of haloceramer-coated seals and the like wherever it is desirable to provide seals having surfaces of excellent heat stability, wear resistance, chemical resistance and toughness.

As the haloceramers employed in this invention are resistive to cold and heat while maintaining excellent elasticity, they can be suitably employed in composite articles or coatings of articles for sealing environments exposed to extreme atmospheric conditions, such as in aerospace, aeronautical and oceanographic fields. Such haloceramers are also useful in preparing composite articles wherein vacuum-type and pressure-type seals are important.

Haloceramers of the present invention may also be used as an elastomeric matrix to be compounded with particles of a relatively hard material (asperities). These asperities are preferably glassy material or ceramic materials in very small beads, fibers or other irregular shapes. Such haloceramers compounded with asperities exhibit high, stable coefficients of friction over a wide temperature range.

The haloceramer compositions of the present invention can be produced by calendering, extruding, molding or solution casting techniques. Molding processes include extrusion molding, pultrusion molding, solution casting and compression molding, for example. Thus, for example, the haloceramer compounds may be fed to a calender and calendered into sheets of varying thicknesses and subsequently cut into various widths. The strips prepared thereby can be cured by passage through a heated oven or by hot air techniques. In a like manner, the haloceramer compositions can be extruded through an appropriate dye to a tape and cured in a manner similar to that described above. When molding techniques are employed, the haloceramer compounds are fed into an appropriate mold and subsequently heated to cause curing of the compound. When haloceramer compositions are prepared by solution casting techniques, the haloceramer compounds may be dissolved in a suitable solvent and the resulting solution poured onto a metal plate with the plate heated to a temperature sufficiently elevated to remove the solvent therefrom and to cause curing of the compound. The solution casting technique is particularly suitable for preparing extremely thin films. Spray coating techniques can also be used.

The haloceramer compositions may be cured by conventional curing procedures. Thus, the haloceramer compounds can be cured to form an elastomeric article by heating the compound in a mold at temperatures from about 100° C. to about 300° C., preferably from 120° C. to 250° C. and most preferably from about 120° C. to about 180° C. The length of curing time ranges from about 5 to about 50 minutes, preferably about 10 to 30 minutes and most preferably about 12 to 20 minutes.

Although the cured articles are pressure sensitive, they can usually be easily stripped from the mold. Some sticking may occur when mold cure is carried out at high temperatures, i.e., above 300° C. However, sticking can be almost completely eliminated through the use of a conventional mold release agent, such as dimethylpolysiloxane oil, a diethylpolysiloxane oil or a dimethylpolysiloxane oil modified with phenylmethylsiloxy units or (beta-phenylethyl) methyl siloxy units.

Composite articles of the present invention (e.g., laminated layers of haloceramers and fluoroelastomers or coatings of haloceramers on previously cured or uncured fluoroelastomers) can be prepared in various ways. For example, a cured or uncured haloceramer compound can be applied to the surface of a natural or synthetic material, for example, a cured or uncured fluoroelastomer, and adhesion effected between the haloceramer compound and such material by the simple application of pressure. If the haloceramer compound and/or the natural or synthetic material are in an uncured state, curing may then be conducted. This curing operation should be substantially complete to provide sufficient bonding of the one or more laminated layers or coatings. After removal from the mold, the surface of the elastomeric article may be cleaned to remove the mold release agent. Curing may be conducted concurrently with the application of pressure for the purposes of bonding laminates together.

The invention will now be described with respect to specific examples, it being understood that these examples are intended to be illustrative. All percentages and parts are by weight unless otherwise indicated.

EXAMPLE 1

A grafted haloceramer composition is prepared by dissolving 250 g of Viton GF in 2.5 liters of methylethyl ketone (MEK) by stirring at room temperature. This is accomplished by using a four liter plastic bottle and a moving base shaker. It takes approximately one hour to two hours to accomplish the dissolution depending upon the speed of the shaker. The above solution is then transferred to a four liter Edenmeyer flask and 25 milliliters of the amine dehydrofluorinating agent, 3-(N-styrylmethyl-2-aminoethylamino) propyltrimethoxysilane hydro-chloride (S-1590, available from Huls America Inc.) is added. The contents of the flask are then stirred using a mechanical stirrer while maintaining the temperature between 55° C. and 60° C. After stirring for 30 minutes, 50 grams of ethoxy terminated polysiloxane (PS-393) and 50 grams of titanium isobutoxide both available from Huls America Inc. are added and stirring continued for another ten minutes. About 25 grams of acetic acid is then added. The stirring is continued while heating the contents of the flask at around 55° C. for another 4 hours. During this time the color of the solution turns light brown which is then cooled to room temperature. To this solution is then added 5 grams of magnesium oxide, 2.5 grams of calcium hydroxide and 12.5 grams of curative VC-50 available from Dow Chemical Co. The above mixture is then ball jarred with ceramic balls as media for 17 hours. The mixture is diluted to 5 liters with methylethyl ketone. A portion of this dispersion (less than 2 liters) is spray coated onto a 10 inches×14 inches steel substrate (3 ml thick). The dry film is then removed by peeling from the substrate and is cured by the following heating procedure: 2 hours at 93° C., 2 hours at 149° C., 2 hours at 177° C., and 16 hours at 208° C. The thickness of the cured film as determined by permoscope is found to be 10.1 mils. The mechanical properties as determined by Instron Model 1123 (standard test protocol ASTM 412) shows the toughness to be 3796 lb-in/in$^3$. Next, a portion of the above dispersion (less than 1 liter) is sprayed to a dry thickness of 2 mils onto the seal. The resulting seal is then cured by the following heating profile: 2 hours at 93° C., 2 hours at 149° C., 2 hours 177° C., and thereafter heating for 16 hours at 208° C. This seal is then cooled to room temperature.

EXAMPLE 2

This example illustrates the flexibility and toughness of the haloceramers of the present invention. In this example, haloceramer compositions and a fluoroelastomer comparative composition were formed into films having the thicknesses indicated in Table 1 below. The fluoroelastomer composition is Viton GF available from E. I. dupont de Nemours, Inc. Examples 1–8 are haloceramers, produced by the methods described above, which contain increasing amounts of titanium isobutoxide (abbreviated TIBO). The films were measured by standard ASTM testing methods for toughness, elongation, tensile strength and initial modulus. The results are reported in Table 1. The elongation variability is +/−2 to 5%.

TABLE 1

| Sample Number | Sample Description | Film Thickness (mil) | Toughness in-lb/in³ | Elongation (%) | Tensile Strength (psi) | Initial Modulus (psi) |
|---|---|---|---|---|---|---|
| Comparative Example 1 | Viton GF | 9.3 | 2714 | 654 | 1209 | 492 |
| 1 | Viton GF + 2% TIBO | 10.8 | 6374 | 702 | 1851 | 2204 |
| 2 | Viton GF + 5% TIBO | 10.4 | 5343 | 731 | 1627 | 1041 |
| 3 | Viton GF + 10% TIBO | 10.8 | 629S | 791 | 1888 | 706 |
| 4 | Viton GF + 15% TIBO | 11.1 | 7543 | 753 | 2040 | 1078 |
| 5 | Viton GF + 20% TIBO | 12.3 | 8740 | 744 | 2647 | 1382 |
| 6 | Viton GF + 2S% TIBO | 11.1 | 8829 | 779 | 2263 | 777 |
| 7 | Viton GF + 30% TIBO | 10.1 | 7479 | 772 | 1952 | 850 |
| 8 | Viton GF + 50% TIBO | 12.5 | 6594 | 676 | 1841 | 959 |

As can be seen from the results, the toughness and strength of the haloceramers is surprisingly superior to that of the fluoroelastomer alone, even with as little as 2% titanium isobutoxide used. Also surprisingly, the elongation of the haloceramers is increased as well.

Figure 1:
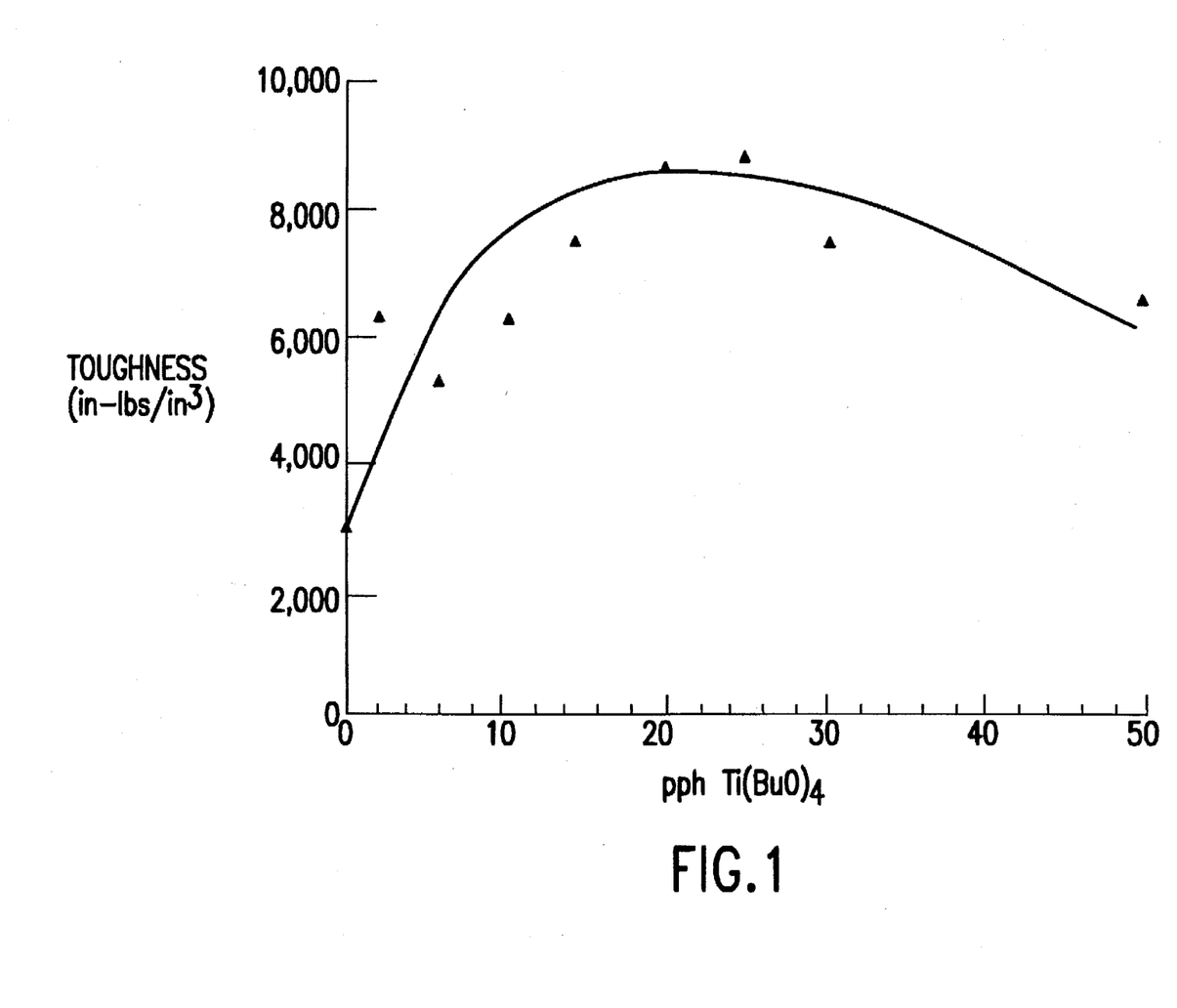
FIG. 1 illustrates the toughness of a haloceramer seal composition with varying amounts of metal oxide.
Figure 2:
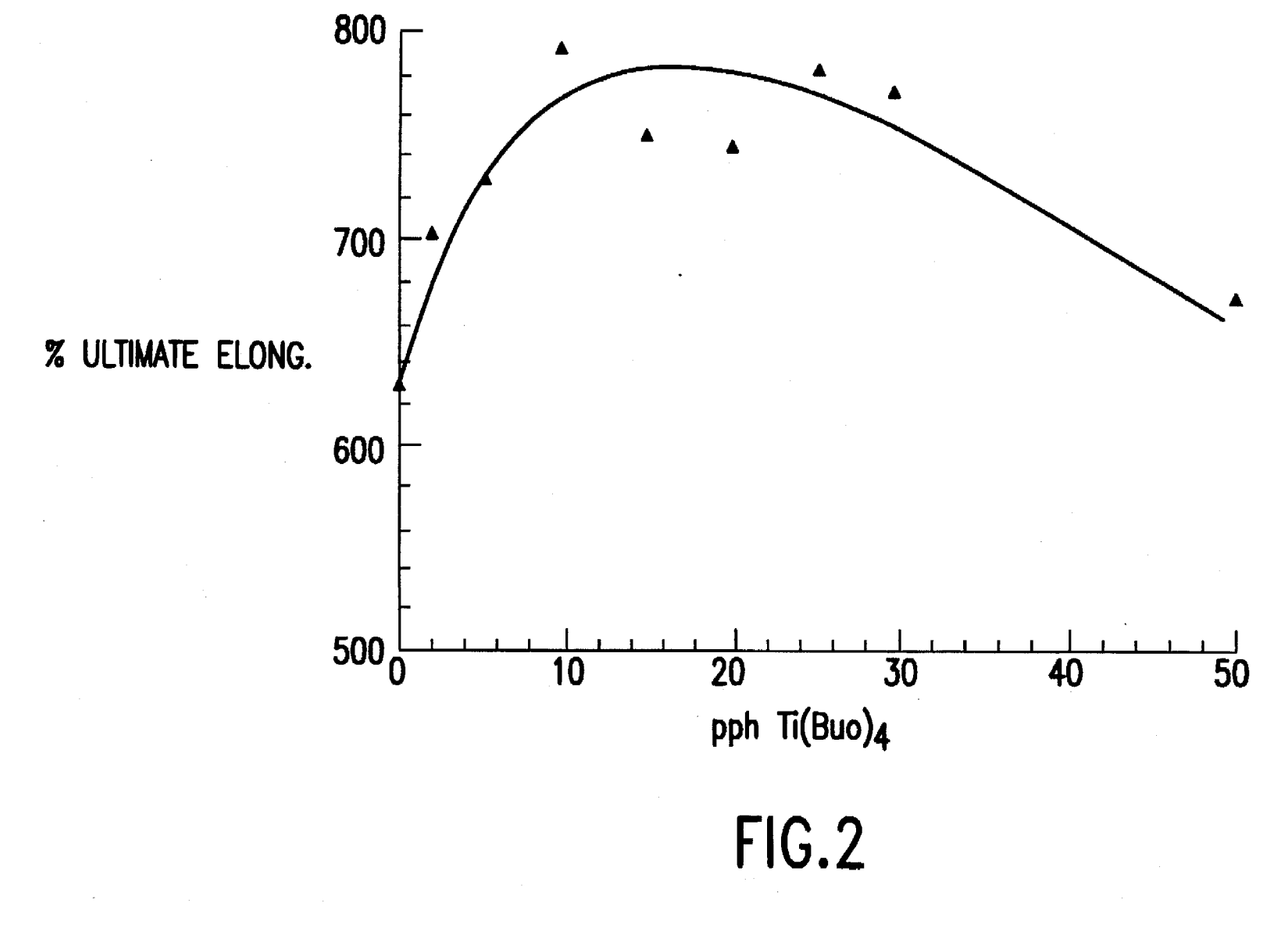
FIG. 2 illustrates the percent ultimate elongation of a haloceramer seal composition with varying amounts of metal oxide.

FIG. 1 shows graphically the toughness of a haloceramer with increasing amounts of titanium isobutoxide, in parts per hundred (pph), as the metal oxide. The points in FIG. 1 are data points, although not representing the results from Example 2. FIG. 2 shows graphically the percent ultimate elongation of a haloceramer with increasing amounts of titanium isobutoxide, in parts per hundred (pph), as the metal oxide. Again, the points in FIG. 2 are data points but do not represent the results from Example 2.

EXAMPLE 3

In this example, the aging properties of a haloceramer composition according to the present invention is evaluated. The haloceramer is a composition of Viton GF with 30% titanium isobutoxide, and is formed into thin films. Example 9 is the control, and is evaluated without aging for toughness, elongation, tensile strength and crosslink density by standard ASTM methods. Examples 10–13 are evaluated for the same properties following aging at 8, 12, 18 and 24 weeks at 204° C. The results are summarized in Table 2.

TABLE 2

| Sample Number | Sample Description | Film Thickness (mil) | Toughness in-lb/in³ | Elongation (%) | Tensile Strength (psi) | Crosslink Density |
|---|---|---|---|---|---|---|
| 9 | Titamer (control) | 11.3 | 9903 | 652 | 4085 | 1.76E-04 |
| 10 | 8 weeks at 204° C. | 11.5 | 13003 | 798 | 4190 | 1.57E-04 |
| 11 | 12 weeks at 204° C. | 11.5 | 10993 | 842 | 3166 | 1.59E-04 |
| 12 | 18 weeks at 204° C. | 11.2 | 10923 | 869 | 2941 | 1.19E-04 |
| 13 | 24 weeks at 204° C. | 11.2 | 10178 | 701 | 3488 | 1.20E-04 |

The results indicate that the haloceramer retains its properties over time under significantly harsh conditions of high temperature.

What is claimed is:

1. A seal comprised of haloceramic material, said material comprising integral, interpenetrating networks of haloelastomer, metal oxide, and optionally polyorganosiloxane;

said integral, interpenetrating networks of haloelastomer, metal oxide and optionally polyorganosiloxane comprising haloelastomer, and metal oxide polymer strands that are intertwined and crosslinked with each other, and optionally comprising polyorganosiloxane polymer strands intertwined and crosslinked with said haloelastomer and metal oxide polymer strands.

2. A seal according to claim 1, wherein said seal comprises a gasket, tape, diaphragm, bearing or o-ring.

3. A seal according to claim 1, wherein said haloelastomer is a fluoroelastomer.

4. A seal according to claim 1, wherein said metal oxide comprises silicon oxide, titanium oxide, aluminum oxide, zinc oxide, copper oxide, iron oxide, arsenic oxide, selenium oxide, tellurium oxide or a mixture thereof.

5. A seal according to claim 1, comprising a composite article having at least one laminated layer of natural or synthetic material bonded to at least one layer of the said haloceramic material.

6. A seal according to claim 1, comprising a substrate coated with said haloceramic material.

7. A seal according to claim 1, wherein said haloceramic material contains at least one of an inorganic filler and an organic filler, said filler being in the form of fibers, particles, beads, or powders.

8. A seal according to claim 1, wherein said polyorganosiloxane is present and is derived from a compound having the formula:

where R independently is an alkyl, alkenyl or aryl, wherein said aryl is optionally substituted with an amino, hydroxy, mercapto, alkyl or alkenyl group; A is a monoo, di- or trialkoxysilane, hydroxy, halogen, alkene or alkyne wherein said alkene or alkyne is optionally substituted with an alkyl or aryl; and n represents the number of segments.

9. A seal according to claim 8, wherein R is an alkyl having from 1 to 24 carbon atoms, alkenyl having from 2 to 24 carbon atoms or aryl having from 6 to 24 carbon atoms, wherein the aryl is optionally substituted with an amino, hydroxy, mercapto or alkyl having from 1 to 24 carbon atoms, or alkenyl having from 2 to 24 carbon atoms; A is a mono-, di- or trialkoxysilane having from 1 to 10 carbon atoms in each alkoxy group, hydroxy, halogen, alkene having from 2 to 8 carbon atoms, or alkyne having from 2 to 8 carbon atoms, wherein the alkene or alkyne is optionally substituted with an alkyl having from 1 to 24 carbon atoms or aryl having from 6 to 24 carbon atoms; and n is from 2 to 350.

10. A seal according to claim 1, wherein said haloceramic material further comprises an amine coupler.

11. A seal according to claim 1, wherein said haloelastomer is present in an amount ranging from 99 to 25% by weight based on the weight of said haloceramic material, and said metal oxide network is present in an amount ranging from 1 to 50% by weight based on the weight of said haloceramic material.

12. A seal according to claim 1, wherein said integral, interpenetrating networks of haloelastomer and metal oxide are of the formula:

wherein the symbol "~" represents the continuation of said networks and M represents at least one member selected from the group consisting of Ti, Si, Al, Zn, Cu, Fe, As, Se and Te.

13. A seal according to claim 12, wherein M represents Si or Ti.

14. A seal according to claim 1, wherein said integral, interpenetrating networks of haloelastomer, metal oxide, and polyorganosiloxane are of the formula:

where R independently is an alkyl, alkenyl or aryl, wherein the aryl is optionally substituted with an amino, hydroxy, mercapto, alkyl or alkenyl group; n represents the number of segments; the symbol "~" represents the continuation of said networks; and M represents Ti, Si, Al, Zn, Cu, Fe, As, Se or Te.

15. A seal according to claim 14, wherein M represents Si or Ti.

16. A seal according to claim 14, wherein said haloelastomer is present in an amount ranging from 99 to 25% by weight based on the weight of said haloceramic material, said metal oxide network is present in an amount ranging from 1 to 50% by weight based on the weight of said haloceramic material, and said polyorganosiloxane is present in an amount ranging from 1 to 50% by weight based on the weight of said haloceramic material.

17. A seal according to claim 1, wherein said haloceramic material further comprises a silane having the formula:

wherein R is an alkyl, alkenyl or aryl, wherein said aryl is optionally substituted with an amine, hydroxy, mercapto, alkyl or alkenyl group.

18. A method of sealing components, comprising placing a seal formed from a composition comprising integral, interpenetrating networks of haloelastomer, metal oxide, and optionally polyorganosiloxane between said components to be sealed;

said integral, interpenetrating networks of haloelastomer, metal oxide and optionally polyorganosiloxane comprising haloelastomer and metal oxide polymer strands that are intertwined and crosslinked with each other, and optionally comprising polyorganosiloxane polymer strands intertwined and crosslinked with said haloelastomer and oxide polymer strands.

19. A method according to claim 18, wherein said components to be sealed comprise components of a joint, valve or seam.

20. A method of according to claim 18, wherein said seal comprises a gasket, tape, diaphragm, bearing or o-ring.

21. A method according to claim 18, wherein said seal is formed by molding or calendering.

22. A method according to claim 21, wherein said molding comprises extrusion molding, injection molding, solution casting or compression molding.

* * * * *